(12) United States Patent
Hoffmann et al.

(10) Patent No.: US 9,011,066 B2
(45) Date of Patent: Apr. 21, 2015

(54) COVERSLIPPING MODULE FOR MOUNTING COVERSLIPS ONTO SPECIMEN SLIDES

(75) Inventors: Joachim Hoffmann, Lorsch (DE); Bernhard Neef, Nussloch (DE); Simon Keimer, Leimen (DE); Karl-Heinz Westerhoff, Eppingen (DE)

(73) Assignee: Leica Biosystems Nussloch GmbH, Nussloch (DE)

( * ) Notice: Subject to any disclaimer, the term of this patent is extended or adjusted under 35 U.S.C. 154(b) by 284 days.

(21) Appl. No.: 13/354,696

(22) Filed: Jan. 20, 2012

(65) Prior Publication Data

US 2012/0189412 A1 Jul. 26, 2012

(30) Foreign Application Priority Data

Jan. 26, 2011 (DE) .................. 10 2011 009 502

(51) Int. Cl.
*B65G 53/48* (2006.01)
*G02B 21/34* (2006.01)

(52) U.S. Cl.
CPC ..................... *G02B 21/34* (2013.01)

(58) Field of Classification Search
CPC ....................................................... B65G 1/00
See application file for complete search history.

(56) References Cited

U.S. PATENT DOCUMENTS

| | | | |
|---|---|---|---|
| 4,033,809 A | 7/1977 | Tipton | |
| 4,248,498 A | 2/1981 | Georges | |
| 5,580,414 A | 12/1996 | Ljungmann | |
| 5,659,421 A | 8/1997 | Rahmel et al. | |
| 6,626,224 B1 | 9/2003 | Ljungmann | |
| 6,847,481 B1 | 1/2005 | Ludl et al. | |
| 2009/0135477 A1 | 5/2009 | Noda | |
| 2010/0068095 A1 | 3/2010 | Keimer et al. | |

FOREIGN PATENT DOCUMENTS

| | | |
|---|---|---|
| DE | 10 2007 011 329 A1 | 9/2008 |
| WO | 94/14097 A1 | 6/1994 |
| WO | 00/37986 A1 | 6/2000 |

OTHER PUBLICATIONS

United Kingdom Intellectual Property Office, Combined Search and Examination Report under Sections 17 and 18(3) in counterpart Application No. GB1200774.6, May 18, 2012.

*Primary Examiner* — Saul Rodriguez
*Assistant Examiner* — Willie Berry, Jr.
(74) *Attorney, Agent, or Firm* — Hodgson Russ LLP

(57) ABSTRACT

The invention relates to a coverslipping module for mounting coverslips onto specimen slides (12) for microscopic investigations, having a transport apparatus (9) for transporting a specimen slide (12) out of a rack (3) or a specimen slide holder to a coverslipping position (13) in which the specimen slide (12) is equipped with a coverslip, and having an alignment device for aligning the specimen slide (12) in the coverslipping position (13) for mounting the coverslip. In order to allow the specimen slide (12) to be reliably and quickly aligned for mounting of the coverslips, thereby ensuring a high level of process dependability with a short processing time, the alignment device are constituted by multiple movable orientation jaws (18) which are arranged so that by closure of the orientation jaws (18), the specimen slide (12) becomes aligned in the coverslipping position (13).

11 Claims, 4 Drawing Sheets

COVERSLIPPING MODULE FOR MOUNTING COVERSLIPS ONTO SPECIMEN SLIDES

CROSS REFERENCE TO RELATED APPLICATIONS

This application claims priority of German patent application number 10 2011 009 502.0 filed Jan. 26, 2011, the entire disclosure of which is incorporated by reference herein.

FIELD OF THE INVENTION

The present invention relates generally to a coverslipping module for mounting coverslips onto specimen slides for microscopic investigations.

BACKGROUND OF THE INVENTION

For pathology investigations, stained specimens or tissue samples, such as a histological section, are secured on specimen slides and equipped with a coverslip. The specimens coverslipped in this fashion can then be investigated under a microscope. Coverslippers, in which mounting of the coverslip or coverslipping of the individual specimen slides occurs in an automated process, are especially suitable for mounting the coverslips onto the microscopic specimen slides. For this process, multiple specimen slides having tissue samples are placed into compartments or slots of a rack or specimen slide holder. The rack having the specimen slides is coupled to a coverslipping unit where each specimen slide is removed from the rack and a mounting medium, an adhesive, or the like is applied onto the specimen slide. The coverslip is then mounted onto the specimen slide in order to seal off the tissue sample on the specimen slide.

Placement of the coverslip onto the specimen slide requires an accurate alignment of the coverslip and specimen slide in order to ensure that the coverslip is precisely positioned on the specimen slide. The reason is that if the coverslip protrudes laterally beyond the specimen slide, there is a risk of damage to or destruction of the coverslip. The person conducting the subsequent analysis might also sustain injury from the protruding coverslip.

DE 699 26 803 T2 has already disclosed an apparatus for coverslipping specimen slides that comprises, at the top end of a transport carriage, an entrainment disk that removes a specimen slide from a rack and conveys it to a coverslipping position. During transport, a mounting medium is applied onto the specimen slide. In the coverslipping position, a coverslip from a magazine is then mounted onto the specimen slide. Correct alignment of the specimen slide with respect to the coverslip is said to be ensured by the fact that the dimensions of the components, and the mutual spacings between the coverslip magazine and the coverslipping position, are coordinated with one another.

An apparatus, known from DE 10 2008 047 575 A1, for coverslipping specimen slides provides means with which the rest position of the specimen slide in space relative to the coverslip can be aligned in order to ensure correct positioning of the components with respect to one another. For this, the specimen slide is arranged in its coverslipping position in a special receiving region of a base frame. The base frame comprises a sensor unit that senses spatial deviations between the coverslip and specimen slide. Adjusting screws, which modify the relative position between the coverslip magazine and the base frame, are actuated on the basis of the deviation values. The relative position of the coverslip in the base frame cannot, however, be corrected in this context. Misalignments that occur in this position can cause the coverslip mounted onto the specimen slide to be skewed, and the coverslipped specimen slide can thereby be damaged.

SUMMARY OF THE INVENTION

It is therefore an object of the invention to make available a coverslipping module with which the specimen slides can be reliably and quickly aligned in the coverslipping position for mounting of the coverslips, so that a high level of process dependability with a short processing time can be ensured. A further intention is that the proposed solution be easy to implement, and entail low costs.

This object is achieved according to the present invention in that the alignment means are constituted by a plurality of movable orientation jaws which are arranged so that by closure of the orientation jaws, the specimen slide becomes aligned in the coverslipping position. Coverslipping occurs in such a way that a specimen slide is removed from the rack, brought into the coverslipping position, and exactly aligned there for the coverslipping operation, in simple fashion, by the orientation jaws. For reasons of process dependability, each individual specimen slide is aligned directly in the coverslipping position. The result is that the alignment operation is highly reproducible, with little time expenditure. After the coverslipping operation, the specimen slide can be conveyed by the transport apparatus back into the rack. The proposed solution requires little installation space, and offers a time-optimized solution for the best possible coverslipping result.

It has proven to be particularly advantageous to provide at least three orientation jaws, which are arranged in such a way that they immobilize the specimen slide on its long sides. This enables the use of sliding mechanisms, which engage on the short sides of the specimen slide, to convey the specimen slide further. As a result of the physical separation of the alignment means and transport means on different sides of the specimen slide, the coverslipping operation can be configured to be particularly rapid. A particular contribution to this is made by the grasping of the specimen slide on its long sides, where the specimen slide can more easily be aligned.

A particularly simple configuration is obtained from the fact that in the context of the alignment operation, the orientation jaws pivot toward the specimen slide, i.e. execute a rotational movement toward the specimen slide. It is also possible, however, to embody the orientation jaws in such a way that they are displaced translationally toward the specimen slide. In each of the two cases, only small or short movements are needed in order to grasp and release the specimen slide.

To achieve a particularly space-saving configuration of coverslippers that are equipped with the coverslipping module, the transport apparatus can also be embodied in such a way that it conveys the coverslipped specimen slide back into the rack. This offers considerable advantages especially in the context of so-called rack processing, so that additional output racks can be omitted.

According to a further embodiment of the invention, the orientation jaws can contribute to secure guidance of the coverslip during coverslipping in the context of the movement toward the specimen slide, by the fact that the orientation jaws are embodied such that in the coverslipping position, they extend vertically beyond the specimen slide. This prevents the applied coverslip from protruding beyond the specimen slide.

It has proven to be particularly advantageous if the coverslipping module has associated with it at least one application apparatus for applying mounting medium onto the specimen slide. The application apparatus is arranged in such a way that the mounting medium can be applied onto the specimen slide while it is being transported out of the rack to the coverslipping position. This guarantees optimum distribution of the mounting medium on the specimen slide, and considerably reduces the duration of the coverslipping operation.

A further embodiment of the invention provides that the coverslipping module has associated with it at least one receptacle for the rack; and that the receptacle is movable vertically in steps, so that with each step, another specimen slide can be transferred by the transport apparatus out of the rack into the coverslipping position, and conveyed back again. A new slot of the rack can be traveled to by way of a simple vertical movement of the rack, so that the specimen slides are made available in accordance with the working cycle of the coverslipping unit. This simplifies the configuration of corresponding transport and ejection mechanisms for removing the specimen slide from the rack.

At least one sensor, which upon vertical movement of the receptacle senses the presence of a specimen slide in the rack, can be provided in order to control the transport apparatus. For example, a rack may be populated with only one specimen slide, and in order to optimize the time sequence of the coverslipping process it is useful, in the context of the downwardly directed indexing movement, to travel only to those positions or slots of the rack that are in fact occupied by a specimen slide. This is detected during the working process, preferably in optical-sensor fashion. The duration of the rack processing operation can thereby be considerably minimized. The sensor apparatus further contributes to ensuring exact vertical positioning of the specimen slide for the ejection operation.

In a refinement of the invention, provision is made that the transport apparatus is movable back and forth in substantially translational fashion; and that the transport apparatus comprises an ejector that grasps the specimen slide at its short side facing away from the coverslipping position, and encompasses a substantially C-shaped bracket that is arranged on the specimen slide on the short side of the specimen slide in the direction toward the coverslipping position. The substantially C-shaped bracket is embodied in such a way that it prevents the specimen slide from escaping laterally during transport, and pushes the specimen slide when it is brought back into the rack. The C-bracket can comprise for this purpose, for example, lateral guidance surfaces that abut against the specimen slide and align it with respect to the movement direction. The advantages of the transport apparatus are evident in particular with the use of a rack which is intended to accept the specimens back again once they are coverslipped. The back-and-forth movement enables rapid cycling or rapid changing of the specimen slides, and requires little installation space. The linear displacement on the part of the ejector that ejects the specimen slide from the rack furthermore ensures that the specimen slide is not tilted, but instead reaches the coverslipping position without escaping. The C-shaped bracket ensures that the specimen slide is conveyed back into the rack in securely guided fashion.

BRIEF DESCRIPTION OF THE DRAWINGS

The invention will be further explained below with reference to an exemplifying embodiment that is depicted in the drawings. All features described and/or graphically depicted, individually or in any combination, constitute the subject matter of the invention, regardless of their grouping in the claims or their internal references. In the drawings:

DETAILED DESCRIPTION OF THE INVENTION

Figure 1:
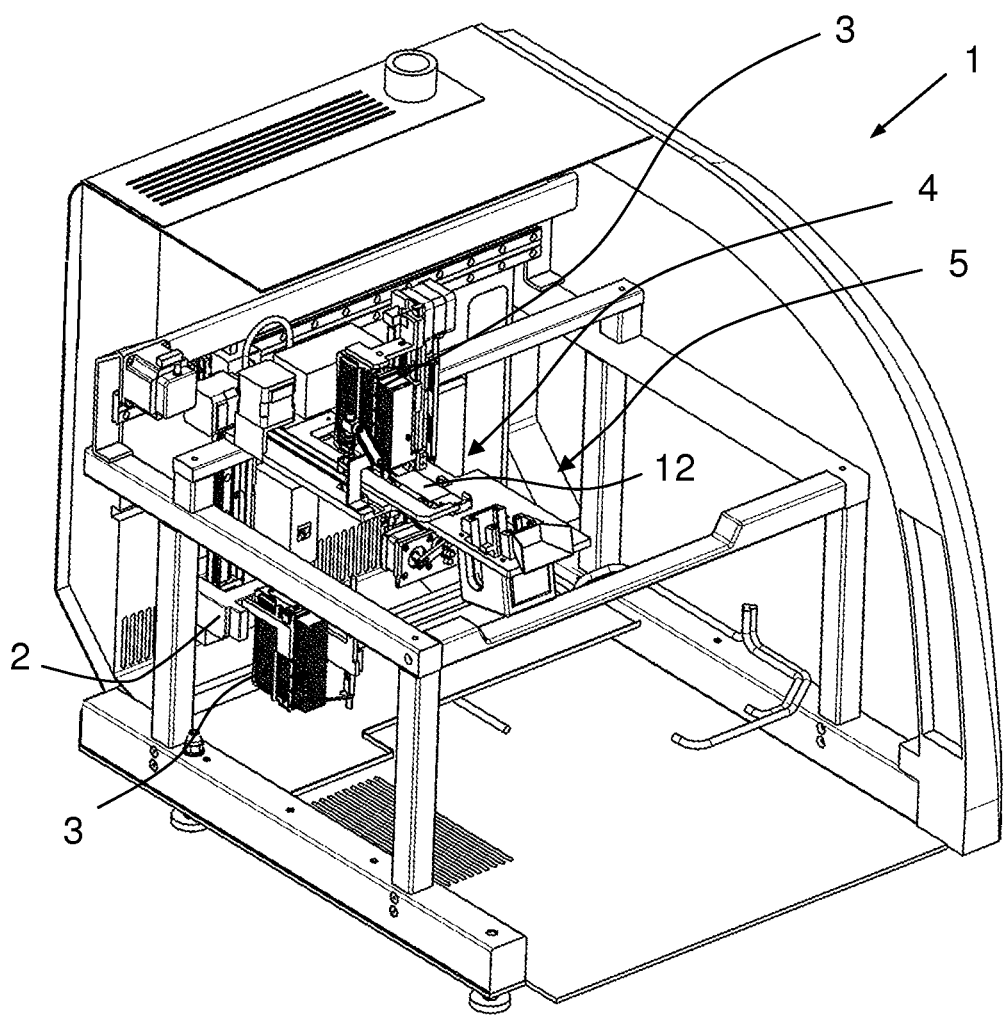
FIG. 1 is a partly sectioned perspective view of a coverslipper having the coverslipping module according to the present invention.

Coverslipper 1 depicted in FIG. 1 comprises in its interior a gripping and transport apparatus 2 by means of which racks 3 for specimen slides are transported inside coverslipper 1. Racks 3 can either be inserted by a laboratory worker, or transferred by an automatic transport system from a stainer to the coverslipper. Gripping and transport apparatus 2 serves to transfer racks 3 to a coverslipping unit 5 that comprises a coverslipping module 4. In coverslipping unit 5, specimen slides present in the rack are equipped, by means of an apparatus not depicted, with a coverslip. Once all the specimen slides present in rack 3 have been coverslipped, rack 3 having the coverslipped specimen slides can be removed from coverslipper 1.

Figure 2:
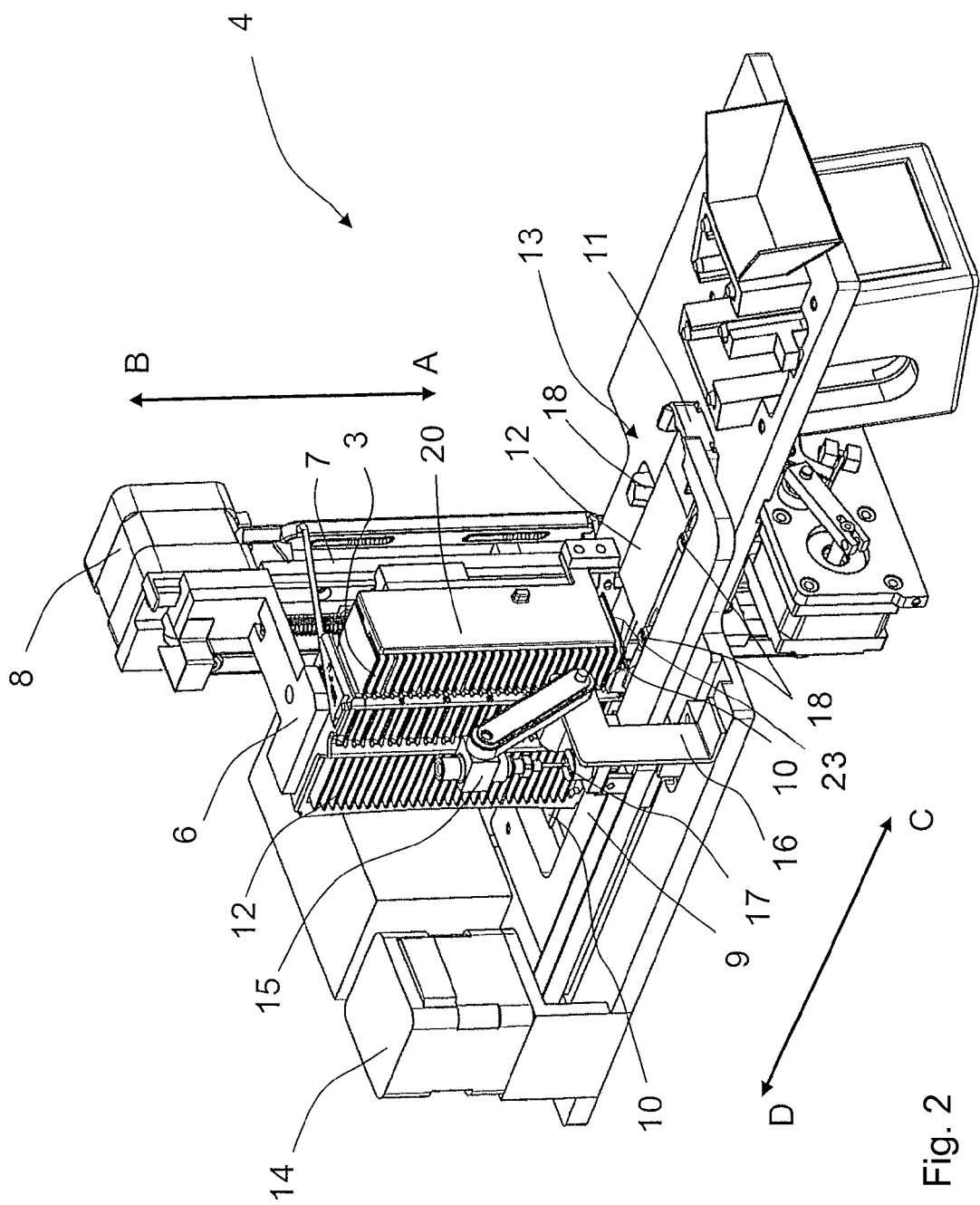
FIG. 2 is a perspective view of the coverslipping module according to FIG. 1.

A more detailed view of coverslipping module 4 is shown in FIG. 2. Rack 3 is inserted by means of gripping and transport apparatus 2 into a rack receptacle 6 that is connected to a vertically oriented guidance system 7. Receptacle 6 can be displaced vertically, in the direction of arrows A and B, by way of a drive system 8. Guidance system 7 is associated with the substantially horizontally aligned coverslipping module 4. Coverslipping module 4 encompasses a transport apparatus 9, embodied as a slide pusher, which can move back and forth horizontally in the direction of arrows C and D. An ejector 10 and a C-bracket 11 are part of transport apparatus 9.

Specimen slides 12 arranged in rack 3 are oriented horizontally in FIG. 2, the specimen slides being loaded into rack 3 one above another with the label field toward the front. The specimen slide present at the lowest point in rack 3 is located, in FIG. 2, on the same horizontal plane as ejector 10 and C-bracket 11. Ejector 10 abuts against the short side, facing away from the coverslipping position, of specimen slide 12, which corresponds to the side of specimen slide in the direction of arrow D. Specimen slide 12 lies with its front side in the direction of arrow C within C-bracket 11. As a result of a pushing movement of transport apparatus 9 in the direction of arrow C, specimen slide 12 is transferred into a coverslipping position 13 in which specimen slide 12 is equipped with the coverslip. During the pushing movement, ejector 10 pushes specimen slide 12 into coverslipping position 13 while C-bracket 11 prevents specimen slide 12 from escaping. Before the ejection operation is begun, a module (not depicted) checks whether a coverslip has been correctly picked up. In the event of breakage of the coverslip, or if two coverslips are picked up, the ejection movement is delayed until a correct coverslip has been picked up. This prevents the mounting medium from being applied onto specimen slide 12 even though a coverslip cannot be made available.

Once specimen slide 12 has been coverslipped, transport apparatus 9 moves back in the direction of arrow D and pushes specimen slide 12, using C-bracket 11, back into its slot in rack 3. The coverslipping process for specimen slide 12 is thereby complete, and the coverslipping process for the next specimen slide in rack 3 can begin. For this, drive system 8 causes a downwardly directed indexing movement of receptacle 6 in the direction of arrow A, with the result that the specimen slide arranged above specimen slide 12 that was just conveyed back into the rack comes to rest between ejector 10 and C-bracket 11. A sensor (not depicted) ensures in this context that the downwardly directed indexing movement is halted only if a specimen is present in the current position of rack 3. When the downwardly directing indexing movement to the next specimen slide to be coverslipped has occurred, transport apparatus 9 pushes the next specimen slide 12 into coverslipping position 13. The back-and-forth movement of transport apparatus 9 occurs by way of a stepping motor 14 having a belt drive. Once coverslipping is complete, specimen slide 12 is pushed back into rack 3. This procedure can be repeated until all the specimen slides in rack 3 are coverslipped. Lastly, rack 3 can be removed from coverslipping module 4 again by gripping and transport apparatus 2.

An apparatus 15 for applying mounting medium onto the specimen slides is arranged in a horizontal direction of arrow C between rack 3 and coverslipping position 13. The apparatus is attached pivotably onto a base frame 16 and comprises a hollow needle 17 by means of which the mounting medium is applied onto specimen slide 12. The hollow needle is pivoted centeredly over the path traveled by the specimen slide between rack 3 and coverslipping position 13. During the ejection movement of specimen slide 12, the mounting medium is applied onto specimen slide 12 along the centerline of the specimen slide and over a specific length. Clean application of the mounting medium is guaranteed by the fact that C-bracket 11 prevents the specimen slide from escaping laterally. Coordination of the drive systems of transport apparatus 9 and application apparatus 15 allows the quantity of medium, and the application form, to be influenced.

Figure 3:
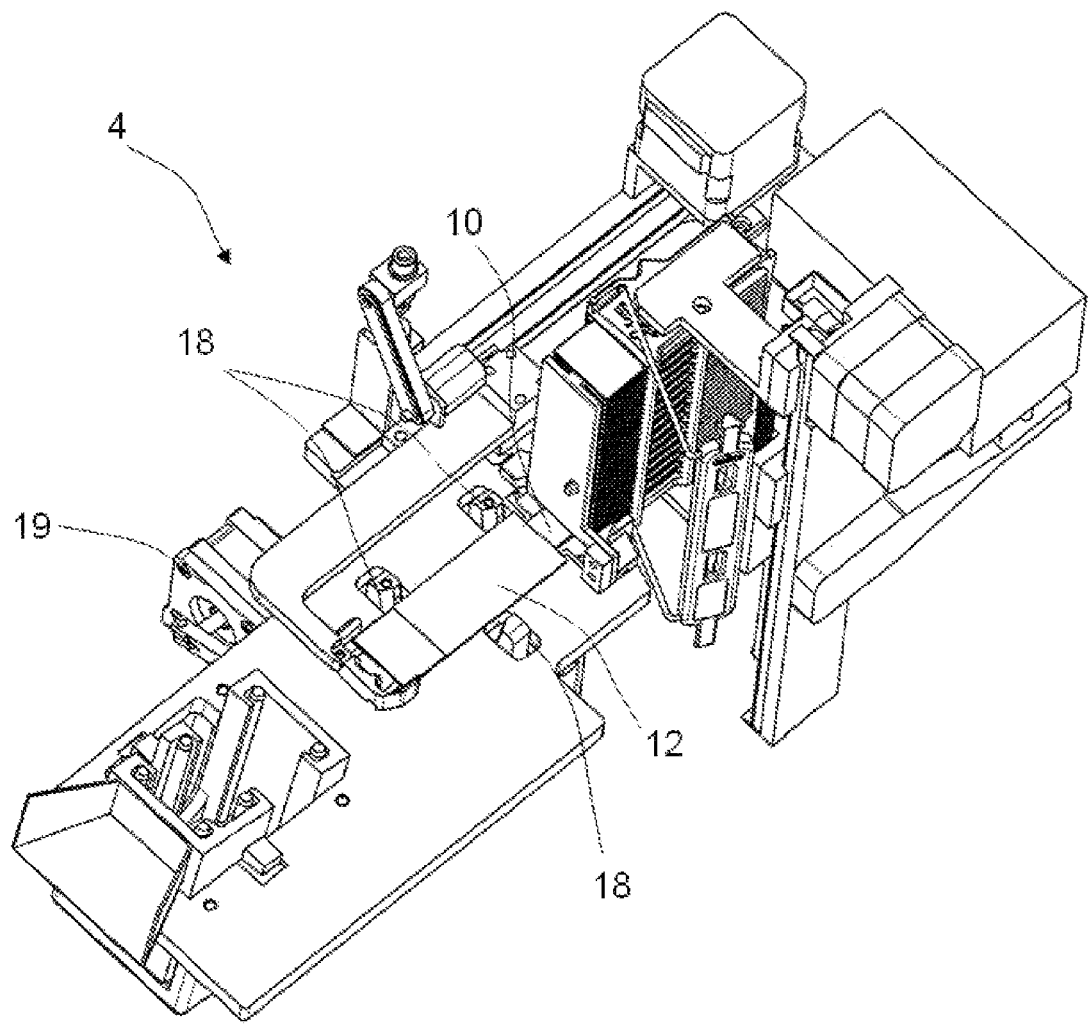
FIG. 3 is a perspective top view of the coverslipping module in FIG. 2.

In order to optimally align specimen slides 12 in coverslipping position 13 for mounting of the coverslip, alignment means in the form of orientation jaws 18 are provided, which grasp specimen slide 12 in coverslipping position 13 laterally at its long sides. As shown by the perspective plan view of FIG. 3, three orientation jaws 18 are arranged in coverslipping position 13 in such a way that two orientation jaws 18 come to rest on the one long side of specimen slide 12, while the third orientation jaw 18 is arranged on the oppositely located long side of specimen slide 12, substantially between the other two orientation jaws 18.

Once specimen slide 12 has been brought by transport apparatus 9 into coverslipping position 13 between C-bracket 11 and ejector 10, orientation jaws 18 close by pivoting toward specimen slide 12. In this context, orientation jaws 18 execute a rotational movement until they come into contact against the specimen slide. Specimen slide 12 becomes centeredly oriented as a result of the closing operation, the combination of the guidance operations by orientation jaws 18, C-bracket 11, and ejector 10 ensuring that each specimen slide 12 from rack 3 is identically aligned in coverslipping position 13. This ensures that the coverslip is put in place centeredly, and lateral protrusion is prevented. The high level of reproducibility has a positive effect on the individual coverslipping operations. Orientation jaws 18 are embodied in such a way that they extend in a vertical direction beyond specimen slide 12. They thus contribute to guidance of the coverslip while the latter is being mounted onto specimen slide 12. The orientation jaws are driven by a drive system 19 that is located substantially below coverslipping module 4. Once coverslipping has occurred, the specimen slide is conveyed back into rack 3 with the aid of transport apparatus 9 and C-bracket 11.

A retaining apparatus 20, which is arranged at a position on the open side of rack 3, is provided in order to prevent the specimen slides from falling out of rack 3. The specimen slide that is about to be or has most recently been coverslipped can be simultaneously slid out of and back into rack 3 through a slot 23 below retaining apparatus 20.

Figure 4:
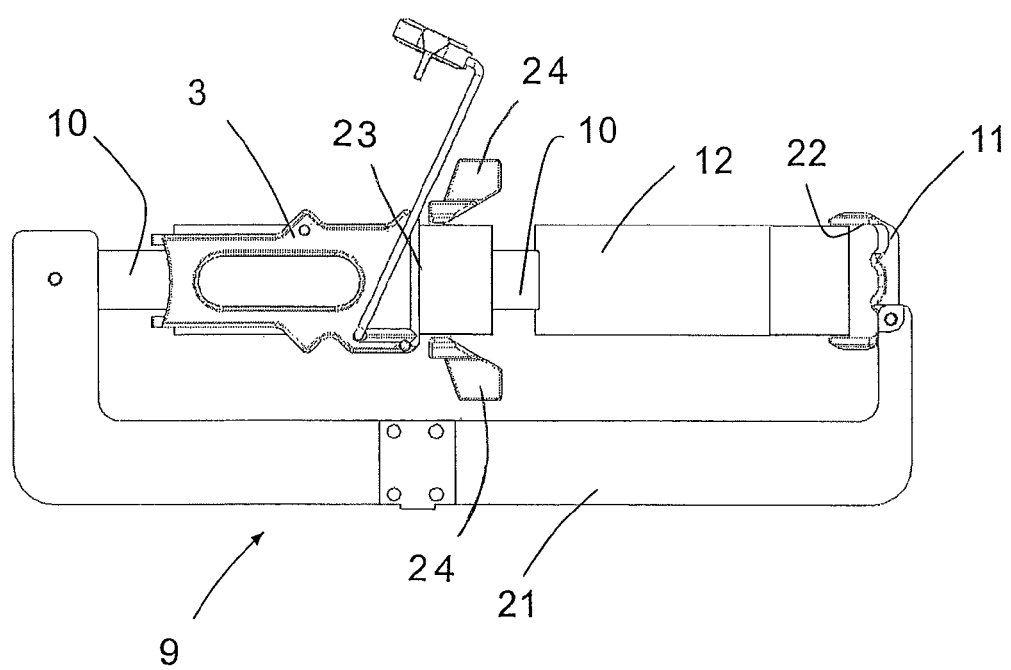
FIG. 4 is a plan view of the transport apparatus of the coverslipping module according to FIG. 2.

FIG. 4 shows a separate view of transport apparatus 9 together with rack 3 and a specimen slide 12. Transport apparatus 9 possesses a U-shaped frame 21. Ejector 10 is attached at one end of frame 21, while C-bracket 11 is fastened at the other end of frame 21. Instead of being assembled from individual components, the entire transport apparatus 9 can also be embodied integrally.

In FIG. 4, specimen slide 12 is located outside rack 3, being pushed out of rack 3 by means of ejector 10 provided on the one side of specimen slide 12. Arranged on the other side of specimen slide 12 is C-bracket 11, which partly fits around specimen slide 12. In that context, guidance surfaces 22 that are embodied on the inner side of C-bracket 11 come into contact against the long sides of specimen slide 12. These guidance surfaces 22 prevent specimen slide 12 from escaping laterally upon ejection from rack 3 and upon reinsertion of specimen slide 12 back into rack 3 after the coverslipping operation.

Additional insertion aids 24 are arranged next to slot 23, between rack 3 and coverslipping position 13, in order to facilitate the guidance of specimen slide 12 in transport apparatus 9.

The invention is not to be limited to the specific embodiments disclosed, and modifications and other embodiments are intended to be included within the scope of the invention.

LIST OF REFERENCE NUMERALS

1 Coverslipper
2 Gripping and Transport Apparatus
3 Rack
4 Coverslipping Module
5 Coverslipping Unit
6 Rack Receptacle
7 Guidance System
8 Drive System for Guidance System
9 Transport Apparatus
10 Ejector
11 C-bracket
12 Specimen Slide
13 Coverslipping Position
14 Stepping Motor
15 Application Apparatus
16 Base Frame
17 Hollow Needle
18 Orientation Jaws
19 Drive System of Orientation Jaws
20 Retaining Apparatus
21 Frame
22 Guidance Surfaces
23 Slot
24 Insertion Aids

What is claimed is:

1. A coverslipping module for mounting coverslips onto specimen slides (12) for microscopic investigations, comprising:
   a transport apparatus (9) configured to transport a specimen slide (12) out of a rack (3) or specimen slide holder to a coverslipping position (13) in which the specimen slide (12) is configured to be equipped with a coverslip; and
   a plurality of movable orientation jaws (18), the movable orientation jaws configured to rotate against the specimen slide (12) to align the specimen slide (12) in the coverslipping position (13);
wherein the specimen slide (12) has a pair of long sides opposite one another and a pair of short sides opposite one another, and wherein the plurality of movable orientation jaws (18) includes at least three orientation jaws (18) configured to engage the pair of long sides of the specimen slide to place specimen slides having different widths into the coverslipping position, the coverslipping position corresponding to a predetermined position in which a centerline of the specimen slide is aligned with a predetermined location of the coverslipping module, the centerline corresponding to an imaginary line between a midpoint of each of the pair of short sides.

2. The coverslipping module according to claim 1, wherein at least two of the at least three orientation jaws (18) are configured to engage one of the pair of long sides of the specimen slide (12) and at least one of the at least three orientation jaws is configured to engage another of the pair of long sides of the specimen slide (12).

3. The coverslipping module according to claim 1, wherein the orientation jaws (18) rotationally pivot to close against the specimen slide (12) to align the specimen slide (12).

4. The coverslipping module according to claim 1, wherein the orientation jaws (18) translationally displace to close against the specimen slide (12) to align the specimen slide (12).

5. The coverslipping module according to claim 1, wherein the transport apparatus (9) is configured to transport a coverslipped specimen slide (12) back into the rack (3).

6. The coverslipping module according to claim 1, wherein the orientation jaws (18) extend vertically beyond the specimen slide (12) to form a guide for the coverslip to be mounted onto the specimen slide (12).

7. The coverslipping module according to claim 1, further comprising at least one application apparatus (15) arranged to apply a mounting medium onto the specimen slide (12) while the specimen slide (12) is being transported out of the rack (3) to the coverslipping position (13).

8. The coverslipping module according to claim 1, further comprising at least one receptacle (6) for the rack (3);
wherein the at least one receptacle (6) is vertically movable in steps, each step being configured to allow the transport apparatus (9) to transfer a subsequent specimen slide (12) out of the rack (3) into the coverslipping position (13), and to transfer the subsequent specimen slide (12) back to the at least one receptacle (6).

9. The coverslipping module according to claim 8, further comprising at least one sensor for controlling the transport apparatus (9), the at least one sensor configured to detect the specimen slide (12) in the rack (3) upon vertical movement of the receptacle (6).

10. The coverslipping module according to claim 1, wherein the specimen slide (12) includes a first short side facing away from the coverslipping position (13) when the specimen slide (12) is in the rack (3) and a second short side opposite the first short side; the transport apparatus (9) is configured to move forward and backward in a substantially translational fashion; and wherein the transport apparatus (9) comprises:
an ejector (10) that abuts the first short side of the specimen slide (12); and
a substantially C-shaped bracket (11) arranged at the second short side, the C-shaped bracket (11) being configured to prevent the specimen slide (12) from escaping laterally during transport, and being configured to push the specimen slide (12) back into the rack (3) from the coverslipping position.

11. A coverslipping module for mounting coverslips onto specimen slides (12) for microscopic investigations, comprising:
a transport apparatus (9) for transporting a specimen slide (12) out of a rack (3) or specimen slide holder to a coverslipping position (13) in which the specimen slide (12) is equipped with a coverslip; and
a plurality of movable orientation jaws (18), the movable orientation jaws being closable against the specimen slide (12) to align the specimen slide (12) in the coverslipping position (13);
wherein the specimen slide (12) includes a first short side facing away from the coverslipping position (13) when the specimen slide (12) is in the rack (3) and a second short side opposite the first short side; the transport apparatus (9) is configured to move forward and backward in a substantially translational fashion; and wherein the transport apparatus (9) comprises:
an ejector (10) that abuts the first short side of the specimen slide (12); and
a substantially C-shaped bracket (11) arranged at the second short side, the C-shaped bracket (11) being configured to prevent the specimen slide (12) from escaping laterally during transport, and being configured to push the specimen slide (12) back into the rack (3) from the coverslipping position.

* * * * *